United States Patent
Kwon et al.

(10) Patent No.: US 9,625,972 B2
(45) Date of Patent: Apr. 18, 2017

(54) METHOD OF REDUCING POWER CONSUMPTION OF SYSTEM SOFTWARE USING QUERY SCHEDULING OF APPLICATION AND APPARATUS FOR REDUCING POWER CONSUMPTION USING THE METHOD

(75) Inventors: Keun-joo Kwon, Seoul (KR); Seok-jin Hong, Hwaseong-si (KR); Seung-woo Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1185 days.

(21) Appl. No.: 13/420,379

(22) Filed: Mar. 14, 2012

(65) Prior Publication Data

US 2012/0239956 A1 Sep. 20, 2012

(30) Foreign Application Priority Data

Mar. 17, 2011 (KR) .......................... 10-2011-0023951

(51) Int. Cl.
*H04M 1/00* (2006.01)
*G06F 1/32* (2006.01)
*G06F 9/48* (2006.01)

(52) U.S. Cl.
CPC ............ *G06F 1/3228* (2013.01); *G06F 1/329* (2013.01); *G06F 9/4893* (2013.01); *Y02B 60/144* (2013.01)

(58) Field of Classification Search
CPC ...... G06F 1/3228; G06F 9/4893; G06F 1/329; Y02B 60/144
(Continued)

(56) References Cited

U.S. PATENT DOCUMENTS 7,512,617 B2 3/2009 Lock et al.
2006/0095902 A1* 5/2006 Nakaike et al. .............. 717/158
(Continued)

FOREIGN PATENT DOCUMENTS

KR 10-2003-0013656 A 2/2003
KR 10-2007-0110440 A 11/2007
(Continued)

OTHER PUBLICATIONS

Urhan, Tolga, et al. "Dynamic pipeline scheduling for improving interactive query performance." Proceedings of the 27th VLDB Conference *VLDB*. vol. 1. 2001. (10 pages).
(Continued)

*Primary Examiner* — Shahriar Behnamian
(74) *Attorney, Agent, or Firm* — NSIP Law

(57) ABSTRACT

A method is provided. The method includes in response to a new query or new input data being input, calculating a required minimum number of cycles per unit time which corresponds to the minimum number of cycles per unit time that is required to process the new query or the new input data, selecting a query to execute first, calculating the number of cycles to be processed during the time period set in advance by multiplying the calculated, required minimum number of cycles per unit time with a time period that is allocated to process the selected query or the input data and is set in advance, and putting a system into a dormant state for a remaining period of time in response to the calculated number of cycles being completely executed within the time period set in advance.

12 Claims, 9 Drawing Sheets

(58) Field of Classification Search
USPC .......................................................... 455/574
See application file for complete search history.

(56) References Cited

U.S. PATENT DOCUMENTS

| 2006/0205382 | A1* | 9/2006 | Wang ................ | H04W 52/029 |
| | | | | 455/343.1 |
| 2009/0254397 | A1 | 10/2009 | Mahdian et al. | |
| 2010/0229178 | A1 | 9/2010 | Ito | |
| 2013/0151879 | A1* | 6/2013 | Thomson et al. ............ 713/322 | |
| 2013/0262905 | A1* | 10/2013 | Yamauchi et al. ............ 713/340 | |

FOREIGN PATENT DOCUMENTS

| KR | 10-2008-0011692 A | 2/2008 |
| KR | 10-2010-0111701 A | 10/2010 |

OTHER PUBLICATIONS

Lorch, Jacob Rubin, et al. *Task-Based Speed and Voltage Scheduling on Windows 2000*. Computer Science Division, University of California at Berkeley Technical Report: CSD-02-1190. Aug. 2002. (16 pages).

Babcock, Brian, et al. "Chain: Operator scheduling for memory minimization in data stream systems." *Proceedings of the 2003 ACM SIGMOD international conference on Management of data*. ACM, Jun. 9-12, 2003. (12 pages).

Carney, Don, et al. "Operator scheduling in a data stream manager." *Proceedings of the 29th international conference on Very large data bases*—vol. 29. VLDB Endowment, 2003. (12 pages).

Yuan, Wanghong, et al. "Energy-efficient soft real-time CPU scheduling for mobile multimedia systems." *19th ACM Symposium on Operating Systems Principles*. Oct. 19-22, 2003. (15 pages).

Sharaf, Mohamed A., et al. "Preemptive rate-based operator scheduling in a data stream management system." *Computer Systems and Applications, 2005, The 3rd ACS/IEEE International Conference on*. IEEE, 2005. (9 pages).

Kao, Ben, et al. "An overview of real-time database systems." *NATO Advanced Study Institute on Real-Time Computing*. 2006. (23 pages).

Sharaf, Mohamed A., et al. "Algorithms and metrics for processing multiple heterogeneous continuous queries." *ACM Transactions on Database Systems (TODS)* 33.1 (2008). (9 pages).

Lang, Willis, et al. "Towards eco-friendly database management systems." *4th Biennial Conference on Innovative Data Systems Research (CIDR)* Jan. 4-7, 2009. (8 pages).

Xu, Zichen, et al. "Exploring power-performance tradeoffs in database systems," *Data Engineering (ICDE), 2010 IEEE 26th International Conference on*. IEEE, 2010. (12 pages).

Korean Office Action issued on Dec. 13, 2016 in counterpart Korean Patent Application No. 10-2011-0023951 (13 pages, with English translation).

* cited by examiner

Input Stream

METHOD OF REDUCING POWER CONSUMPTION OF SYSTEM SOFTWARE USING QUERY SCHEDULING OF APPLICATION AND APPARATUS FOR REDUCING POWER CONSUMPTION USING THE METHOD

CROSS-REFERENCE TO RELATED APPLICATIONS

This application claims the benefit of Korean Patent Application No. 10-2011-0023951, filed on Mar. 17, 2011 in the Korean Intellectual Property Office, the entire disclosure of which is incorporated herein by reference for all purposes.

BACKGROUND

1. Field

The following description relates to a method of reducing power consumption of system software using query scheduling of application and an apparatus for reducing power consumption using the method.

2. Description of the Related Art

Energy consumed by a central processing unit (CPU) in a computer system is significant. In general, a scheduler of a data stream processor system focuses on which query to execute first in order to reduce an average response time. However, the scheduler does not take into consideration reducing power consumption. Thus, even in response to a system load being smaller than the maximum processing capacity, a high voltage is always used to ensure the best performance. In addition, traditionally, scheduling of a data base system focuses on concurrency control and buffer management and thus dynamic voltage scaling to minimize power consumption is not taken into consideration. In particular, as illustrated in FIG. 1, in a mobile gateway, a data stream processing system may process biosensor data collected using a biosensor in real-time or respond to an emergency call according to a body's condition. At this point, the data stream processing system may reduce battery consumption.

SUMMARY

According to an aspect, a method of reducing power consumption using query scheduling of an application program is provided. The method includes in response to a new query or new input data being input, calculating a required minimum number of cycles per unit time which corresponds to the minimum number of cycles per unit time that is required to process the new query or the new input data, selecting, in response to a plurality of queries to be processed existing, a query to execute first, calculating the number of cycles to be processed during the time period set in advance by multiplying the calculated, required minimum number of cycles per unit time with a time period that is allocated to process the selected query or the input data and is set in advance, and putting a system into a dormant state for a remaining period of time in response to the calculated number of cycles being completely executed within the time period set in advance.

The selecting operation may include in response to a new query or a new input data not existing, waiting for input of a new query or a new input data.

The selecting, the calculating and the putting may be repeated until a new query or a new input data does not exist.

In another aspect, a method of reducing power consumption using query scheduling of an application program is provided. The method includes checking whether a new query or new input data exists in an input unit of a data base system or a data stream processing system, in response to a new query or new input data existing, calculating a required minimum number of cycles per unit time which corresponds to the minimum number of cycles per unit time that is required to process the new query or the new input data, selecting, in response to a plurality of queries to be processed existing, a query to execute first, calculating the number of cycles to be processed during the time period set in advance by multiplying the calculated, required minimum number of cycles per unit time with a time period that is allocated to process the selected query or the input data and is set in advance, measuring an actual time taken to execute the calculated number of cycles, and in response to the measured time being less than the time period set in advance and a the difference between the measured time and the time period set in advance is equal to or longer than a predetermined value, putting a processor of a system into a dormant state during time corresponding to the difference.

The method may include in response to the calculated number of cycles not being executed during the time period set in advance, and a plurality of queries to be processed for the remaining query or input data existing, selecting a query to execute first, calculating the number of cycles to be processed during the time period set in advance by multiplying the calculated, required minimum number of cycles per unit time with a time period that is allocated to process the selected query or the input data and is set in advance, measuring an actual time taken to execute the calculated number of cycles, and in response to the measured time being less than the time period set in advance and a difference between the measured time and the time period set in advance being equal to or longer than a predetermined value, putting a processor of a system into a dormant state during time corresponding to the difference.

The method may include in response to all of the calculated number of cycles being executed during the time period set in advance, waiting for an input of a new query or new input data.

The required minimum number of cycles per unit time may be calculated by calculating the required minimum number of cycles with respect to a query regarding a periodic stream and a query regarding an intermittent stream and summing the two required minimum numbers of cycles.

The required minimum number of cycles per unit time with respect to the period stream may be calculated according to the following Equation:

$$\sum_{i=1}^{n} \frac{C_i}{P_i} \qquad \text{[Equation]}$$

$C_i$=predicted number of cycles to be executed per record of an i-th operator $P_i$=period of an input stream of an i-th query n=Number of periodic queries.

The required minimum number of cycles per unit time with respect to the intermittent stream may be calculated according to the following Equation:

$$\max_{i=1,\ldots,n} \frac{\sum_{j=1}^{i} C_j}{D_i} \quad \text{[Equation]}$$

Ci=predicted number of cycles to be executed per record of an i-th operator
Di=deadline of an i-th query
n=Number of queries, where queries are aligned in order of deadlines.

The required minimum number of cycles per unit time with respect to the intermittent stream may be calculated by bundling a predetermined number of pieces of input data into batches.

The calculating of the required minimum number of cycles of a query with respect to an intermittent stream may include bundling a predetermined number of pieces of input data into batches, aligning the batches in order of deadlines and sequentially accumulating cycles predicted to be executed, and determining the greatest value among those obtained by dividing the accumulated cycle by a deadline as a required minimum number of cycles to be executed.

In another aspect, a method of reducing power consumption using query scheduling of an application program is provided. The method includes checking whether a new query or new input data exists in an input unit of a data base system or a data stream processing system, in response to a new query or new input data existing, calculating a required minimum number of cycles per unit time which corresponds to the minimum number of cycles per unit time that is required to process the new query or the new input data, selecting, in response to a plurality of queries to be processed existing, a query to execute first, setting a deadline by which the query or input data is to be processed by calculating a predicted time period for executing the selected query and by using the calculated, required minimum number of cycles per unit time and the predicted time period for executing the selected query, setting an optimum central processing unit (CPU) input voltage by transmitting the deadline and the cycles predicted to be executed, and calculating and executing the number of cycles to be processed by the deadline by multiplying the calculated, required minimum number of cycles per unit time with the deadline.

The method may include selecting, in response to a plurality of queries to be processed with respect to a remaining query or input existing, a query to execute first, setting a deadline by which the query or input data is to be processed by calculating a predicted time period for executing the selected query and by using the calculated, required minimum number of cycles per unit time and the predicted time period for executing the selected query, calculating the number of cycles to be processed by the deadline by multiplying the calculated, required minimum number of cycles per unit time with the deadline, setting an optimum CPU input voltage by transmitting the deadline and the cycles predicted to be executed, and calculating the number of cycles to be processed by the deadline by multiplying the calculated, required minimum number of cycles per unit time with the deadline, and executing the calculated number of cycles.

The method may include in response to all of the calculated cycle numbers being executed by the deadline set in advance, waiting for an input of a new query or new input data.

The required minimum number of cycles per unit time may be calculated by calculating the required minimum number of cycles with respect to a query regarding a periodic stream and a query regarding an intermittent stream and summing the two required minimum numbers of cycles.

The required minimum number of cycles per unit time with respect to the period stream may be calculated according to the following Equation:

$$\sum_{i=1}^{n} \frac{C_i}{P_i} \quad \text{[Equation]}$$

Ci=predicted number of cycles to be executed per record of an i-th operator
Pi=period of an input stream of an i-th query
n=Number of periodic queries.

The required minimum number of cycles per unit time with respect to the intermittent stream is calculated according to the following Equation:

$$\max_{i=1,\ldots,n} \frac{\sum_{j=1}^{i} C_j}{D_i} \quad \text{[Equation]}$$

Ci=predicted number of cycles to be executed per record of an i-th operator
Di=deadline of an i-th query
n=Number of queries, where queries are aligned in order of deadlines.

The required minimum number of cycles per unit time with respect to the intermittent stream may be calculated by bundling a predetermined number of pieces of input data into batches.

The calculating of a required minimum number of cycles of a query with respect to an intermittent stream may include bundling a predetermined number of pieces of input data into batches, aligning the batches in order of deadlines and sequentially accumulating cycles predicted to be executed, and determining the greatest value among those obtained by dividing the accumulated cycle by a deadline as a required minimum number of cycles to be executed.

In another aspect, a mobile terminal including a data base system or a data stream processing system on an operating system is provided. The terminal includes a required minimum cycle calculation unit configured to, in response to a new query or new input data being input, calculate the required minimum number of cycles per unit time which corresponds to the minimum number of cycles required to process the new query or the new input data per unit time, a query selection unit configured to select a query to execute first, in response to a plurality of queries to be processed existing, a query/input data processing unit configured to calculate and execute the number of cycles to be processed during the time period set in advance by multiplying the required minimum number of cycles per unit time with a time period that is allocated to process the selected query or input data, and a system control unit configured to control a system to be in a dormant state for the remaining time period in response to the execution of the calculated number of cycles being completed within the time period set in advance.

The terminal may include a new query/input data checking unit configured to check whether a new query or new input data exists in an input unit of the data base system or the data stream processing system. The query/input data processing unit may include a processed cycle number calculation unit configured to calculate the number of cycles to be processed during a time period set in advance by multiplying the required minimum number of cycles per unit time with time that is allocated to process the selected query or input data and is set in advance, and an execution time measuring unit configured to measure an actual time taken to execute the calculated number of cycles, and the system control unit may control a system to be in a dormant state for the remaining time period in response to the execution of the calculated number of cycles being completed within the time period set in advance.

In response to the calculated number of cycles not being executed during the time period set in advance, and a plurality of queries to be processed for the remaining query or input data existing, the query selection unit may select a query to execute first.

In another aspect, a mobile terminal including a data base system or a data stream processing system on an operating system is provided. The terminal includes a required minimum cycle calculation unit configured to, in response to a new query or new input data being input, calculate the required minimum number of cycles per unit time which corresponds with the minimum number of cycles required to process the new query or the new input data per unit time, a query selection unit configured to select a query to execute first, in response to a plurality of queries to be processed existing, a deadline setting unit configured to calculate a predicted time period for executing the query, and setting a deadline by which the query or input data is to be processed by using the calculated, required minimum number of cycles per unit time and the predicted time period for executing the selected query, a CPU input voltage setting unit configured to transmit the deadline by which the query or input data is to be processed and cycles predicted to be executed, to an operating system to set up an optimum CPU input voltage, and a query/input data processing unit configured to calculate and perform the number of cycles to be processed before the deadline by multiplying the calculated required minimum number of cycles per unit time with the deadline.

The mobile terminal may include a new input data/query checking unit configured to check whether a new query or new input data exists in an input unit of the data base system or the data stream processing system.

A computer readable recording medium may have embodied thereon a program for executing the method.

In another aspect, a method of reducing power consumption using query scheduling of an application program is provided. The method includes calculating a required minimum number of cycles per unit time which corresponds to the minimum number of cycles per unit time that is required to process a new query or a new input data, calculating the number of cycles to be processed during the time period set in advance by multiplying the calculated, required minimum number of cycles per unit time with a time period that is allocated to process the selected query or the input data and is set in advance, and putting a system into a dormant state for a remaining period of time in response to the calculated number of cycles being completely executed within the time period set in advance.

Other features and aspects may be apparent from the following detailed description, the drawings, and the claims.

Figure 1:
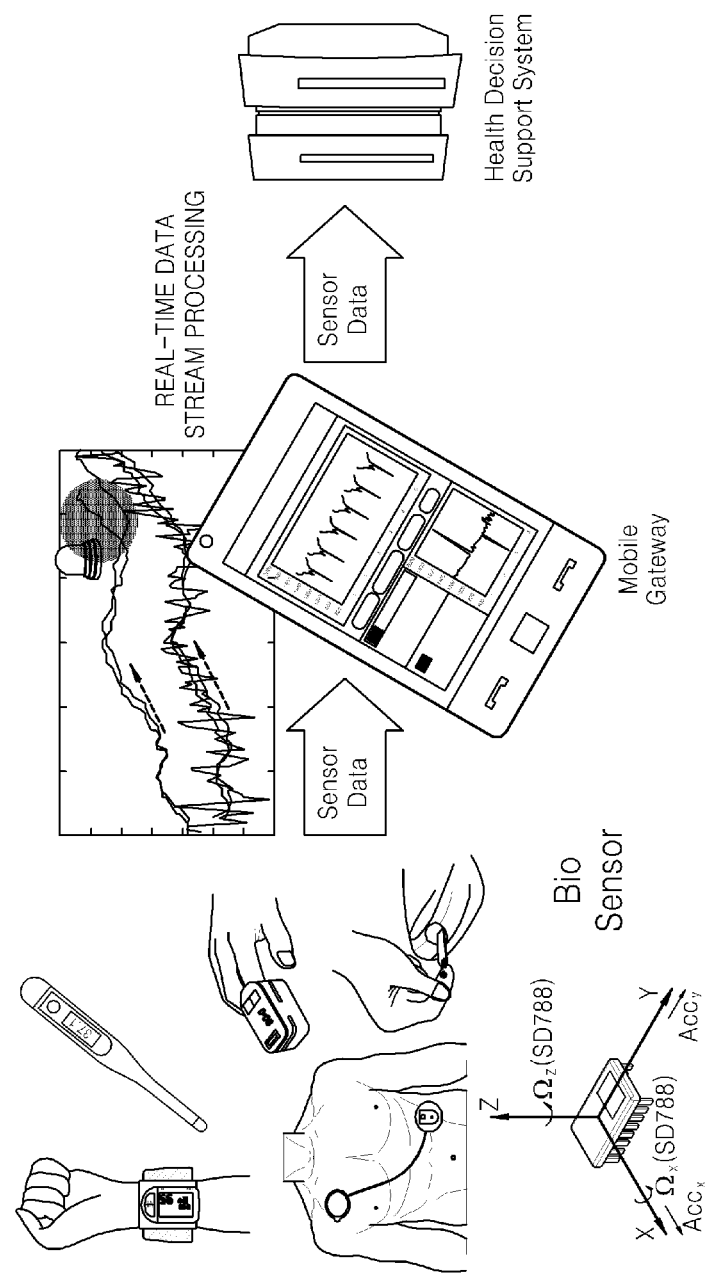
FIG. 1 illustrates an example of a mobile gateway that processes sensor data collected using a biosensor, to generate a real-time data stream.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In general, a central processing unit (CPU) in a computer system consumes a significant amount of energy. CPU manufacturers have been using a dynamic frequency and voltage scaling method to address this problem. The dynamic frequency and voltage scaling method is based on a physical principle of semiconductors whereby a switching rate of a transistor decreases in response to a voltage decreasing, and that an input frequency of a processor has to be reduced as time taken for an operation increases. Energy consumed by a processor may be expressed according to Ohm's law, as given by Equation 1 below.

$$P=CV^2F \text{ (P: power; C: capacitance; V: voltage; F: frequency)} \quad \text{[Equation 1]}$$

Thus, to reduce power consumption of a system, using software may reduce an input voltage needed in response to high speed processing not being required. Adjusting a multiplier register of a front side bus (FSB) may typically vary an input frequency, and while the frequency is being modified, a period exists when an instruction cannot be executed, and time is also required to change an external voltage. Recent developments in technology have resulted in an adjustment of the number of executed cycles up to a cycle represented in scale of 10 us and the time taken to modify a voltage may be in units of 100 ms.

For example, taking a correlation between a frequency and a voltage into consideration, a minimum power consumption may be four times smaller than a maximum power consumption in an Intel Pentium M processor.

Hereinafter, the effect of dynamic voltage scaling (DVS) will be described. As shown in Table 1, a processor having three input voltages and frequencies may be assumed.

TABLE 1

| $V_{dd}$ [V] | 5.0 | 4.0 | 2.5 |
|---|---|---|---|
| Energy per cycle [nJ] | 40 | 25 | 10 |
| $f_{max}$ [MHz] | 50 | 40 | 25 |
| cycle time [ns] | 20 | 25 | 40 |

Power consumptions in response to performing an operation requiring a 1 Giga cycle using the above processor a) at the maximum voltage/frequency, b) at 5 V for 15 minutes and at 2.5 V for 10 seconds, and c) at 4 V for 25 seconds are compared as below.

Figure 2A:
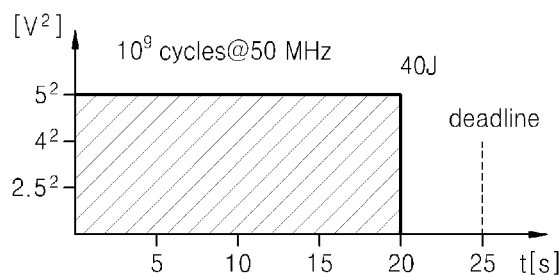
FIG. 2 illustrates examples of graphs showing energy consumption in each case shown in Table 1 for explaining the effect of dynamic voltage scaling (DVS)
Figure 2B:
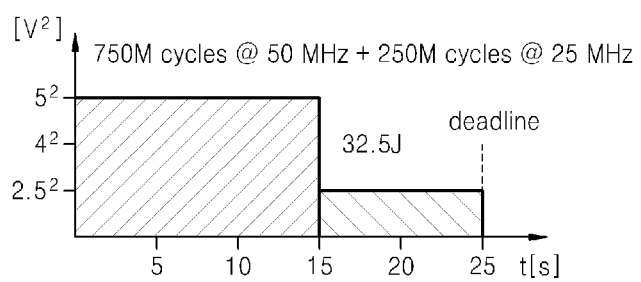
Figure 2C:
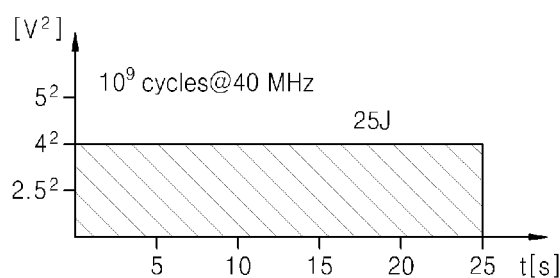

In a) of FIG. 2, consumed energy Ea is $E_a = 10^{9} \times 40 \times 10^{-9} = 40$ [J], and in b), consumed energy is $E_b = 750 \times 10^{6} \times 40 \times 10^{-9} + 250 \times 10^{6} \times 10 \times 10^{-9} = 32.5$ [J], and in c), consumed energy is $E_c = 10^{9} \times 25 \times 10^{-9} = 25$ [J].

In c) of FIG. 2, in response to performing an operation requiring a 1G cycle at 4V for 25 seconds, 25 J is consumed, which corresponds to 62.5% of the power of 40 J, the energy consumed in response to performing at the maximum voltage/frequency of the case a) and can satisfy the same deadline as that of a), where the deadline relates to by which the operation by the processor is to be finished. Since power consumption according to Ohm's law may be proportional to a square of a voltage, in response to performing the same operation, maintaining the minimum voltage all the time may consume the least power.

Hereinafter, a variable voltage adjustment algorithm used in an operating system will be described. A scheduling algorithm that adjusts a voltage according to a system condition in terms of the operating system has been studied. The scheduling algorithm may be divided into two methods.

The first method is an interval-based DVS method. A scheduling time may be divided into sections and a CPU use rate of a corresponding section may be checked. Time for each section may be greater than time taken in adjusting a voltage. In response to the use rate being equal to or greater than a predetermined value, an input voltage of the processor for a next section may be increased. In response to the use rate being equal to or less than a predetermined value, an input frequency of a next section may be reduced. This method does not require correction of conventional applications, and thus the method may be used in general operating systems such as Windows and Linux.

The second method is a task-based DVS method. A frequency at which a minimum power is consumed is determined according to a worst case execution time and a deadline of each application operation to set the frequency as a corresponding frequency. More power may be saved using the task-based DVS method rather than the interval-based DVS method. As another aspect, in the interval-based DVS method, the worst case execution time and the deadline of the application may need to be clearly stated. Thus, the task-based DVS method may be selected to be used in a real time operating system. The scheduling algorithm may select that each task has periodical characteristics to perform scheduling. Since execution characteristics of each application may not be known, execution time may be predicted using a probability-based prediction model. In response to the operating system scheduling algorithm being applied to a data base system or a data stream processing system, the algorithm may not be suitable for a periodic model in the case of an ad-hoc query.

The data base system or the data stream processing system may be performed as a single application, and thus direct control of a voltage of a processor may affect execution and operating systems of other applications. Accordingly, one may choose that a scheduler of an operating system uses a DVS method and the operating system may be designed to use minimum power according to the DVS method.

In general, a scheduling algorithm of a data stream processing system may be concerned with which query to execute first in order to reduce an average response time. Thus, the scheduling algorithm may not consider reducing power consumption of the data stream processing system and the highest voltage is used to always show the best performance even in response to a system load being smaller than a maximum processing capacity. As another aspect, in the scheduling algorithm according to the current example, a system may be designed to use a small voltage, in response to a system load not being large, to thereby reduce the total power consumption. This method may be used in connection with conventional scheduling algorithms.

In addition, scheduling of a data base system may be concerned with concurrency control and buffer management, and minimizing power consumption is given almost no consideration. Although power consumption of a processor according to a system voltage is considered, an input voltage and a frequency of the system are varied and performance of a database management system (DBMS) is measured, the above-described method may not be a DVS method but merely involves a set up value of a basic input/output system) (BIOS) being set to a different value before system boot up. Thus, the above method is not appropriate in response to a load condition changing. As another example, suggesting a cost model designed in consideration of power consumption in a query optimizer may reduce power consumption. Although this method is a query execution planning method and not a dynamic scheduling algorithm, the method may be used in connection with the scheduling method according to the current example.

Scheduling structures in the data base system and the data stream processing system will be described below. In response to various data tables being given, the data base system may process several queries that are input by the user or by transaction at the same time. The data stream processing system may include several continuous queries that are registered in advance and receive continuously entering data stream to process queries and produce results. The queries may be converted into tree-structured query performance plans in which multiple executable operators are connected, and stored.

Figure 3:
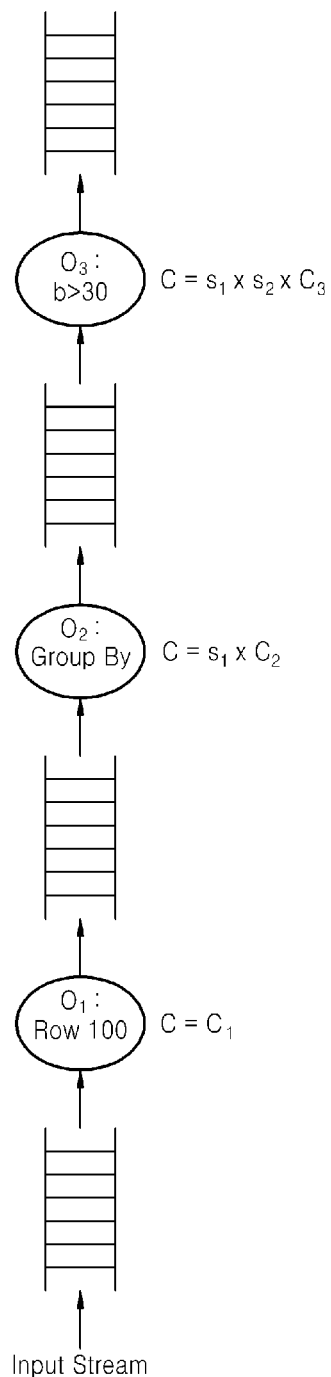
FIG. 3 illustrates an example of a query execution plan presented in a tree structure in which multiple operators are connected.

The query execution plan may be expressed as a tree structure. The tree structure may connect multiple operators. For example, the query execution plan "select sum(a), c from S[Row 100] where b>30 group by c" may be expressed as shown in FIG. 3. In FIG. 3, O may correspond to an operator, s may correspond to selectivity, and C may correspond to the number of cycles that is predicted to be executed per record of an operator. In addition, in order to reduce the cost of calculating the required minimum number of cycles, a fixed number of pieces of input data may be bundled into batches to be used as a calculation unit.

A scheduler of the data base system or the data stream processing system may determine which query to execute and for how long to execute the query among various queries that are currently to be executed. The scheduler may control CPU cycles predicted to be executed per input record, a required response time of a query, the number of records included in a current query input for each query, and regarding a stream processing system, whether an input stream of a query is periodic or not periodic and an input period.

Figure 4:
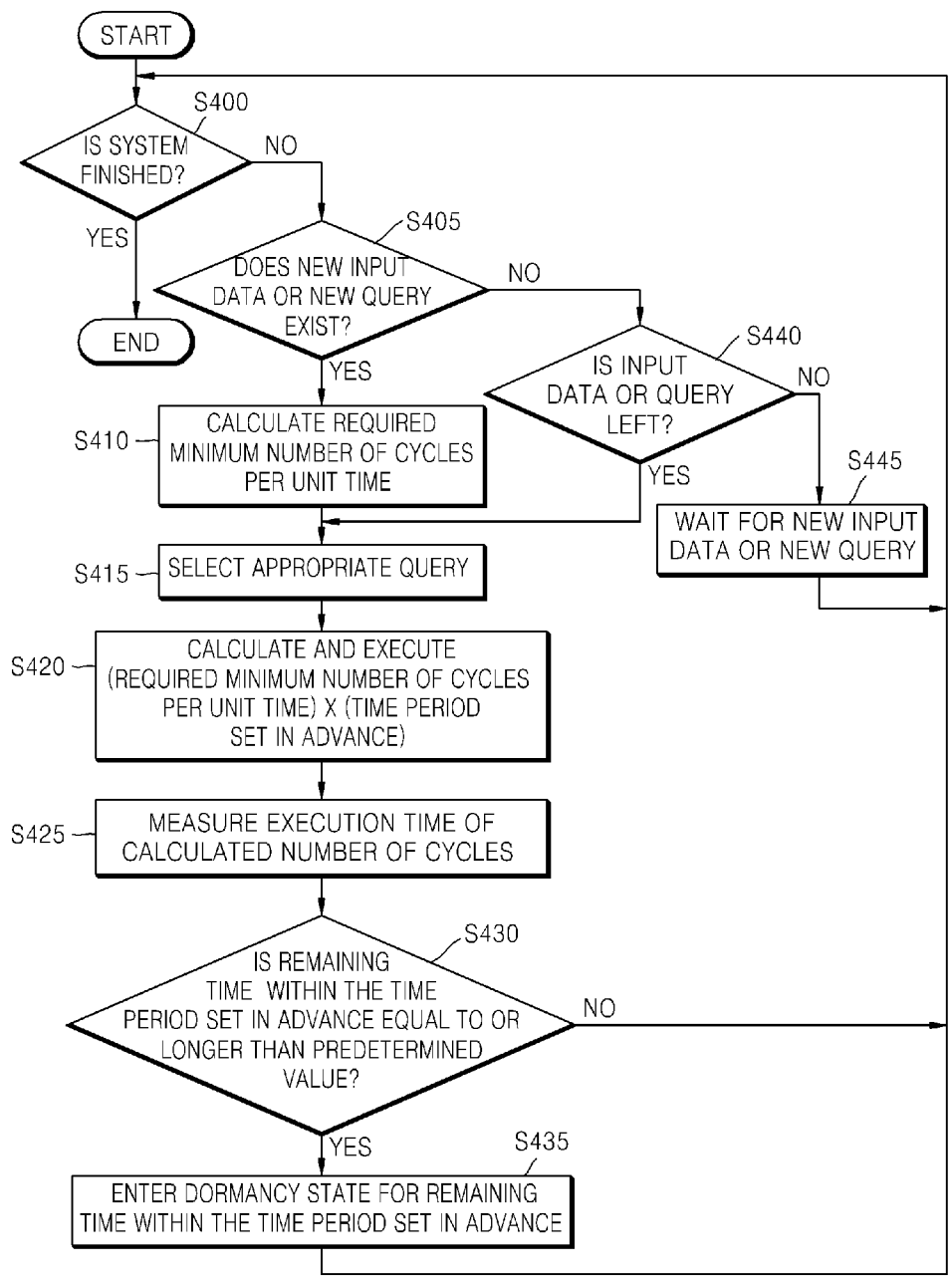
FIG. 4 is an example of a flowchart illustrating a method of reducing power consumption of a system using query scheduling of an application program.

Meanwhile, an example of the method of reducing power consumption of a system using query scheduling of an application program will be described. FIG. 4 illustrates an example of a method of reducing power consumption of a system using query scheduling of an application program.

Referring to FIG. 4, first, in a state where a system is not finished, for example, in response to no system end flag existing in operation S400, a scheduling algorithm may be repeated. In addition, at each turn, checking whether a new query or new input data exists in an input unit of the data base system or the data stream processing system in operation S405. In other words, the data base system simply checks whether a new query exists, and the data stream processing system checks whether new input data or a new query exists.

In response to a new query or new input data existing, the required minimum number of cycles per unit time, in other words, the number of cycles per minimum unit of time that is required to process the new query or the new input data, may be calculated in operation S410. In other words, checking whether new input data or a new query exists at every turn, and in response to new input data or new query existing, the required minimum number of cycles may be calculated again and renewed.

In operation S415, in response to the data base system or the data stream processing system having to process a plurality of queries, a query to be executed first is selected.

In operation S420, the calculated, required minimum number of cycles per unit time and a time period that is allocated to process the selected query or the input data and is set in advance are multiplied to calculate the number of cycles to be processed during the time period set in advance.

In operation S425, time actually taken to execute the calculated number of cycles may be measured.

In operation S430, in response to a determination that the measured time is less than the time period set in advance, and in response to a difference of the measured time and the time period set in advance being more than a predetermined value, the processor of the system does not operate but instead lies dormant for a time period corresponding to the difference of the measured time and the time period set in advance in operation S435.

Meanwhile, in response to the calculated number of cycles not being executed during the time period set in advance, in other words, in response to the remaining time within the set time period examined in operation S430 not being more than a predetermined time period, checking whether any query or input data remains occurs in operation S440. After checking, in response to any query or input data remaining, and a plurality of queries to be processed for the remaining query or input data, a query to be executed first is selected in operation S415. Then, in operation S420, the calculated required minimum number of cycles per unit time and a time period that is allocated to process the selected query or input data and is set in advance may be multiplied to calculate the number of cycles to be processed during the time period that is set in advance. In operation S425, time actually taken to execute the calculated number of cycles may be measured. In operation S430, in response to the measured time period being less than the time period set in advance, and in response to a difference between the measured time period and the time period set in advance being more than a predetermined value, the processor of the system may not operate and instead enter into a dormant period for a time period corresponding to the difference between the measured time period and the time period set in advance in operation S435.

Meanwhile, in response to all of the calculated number of cycles being executed during the time period set in advance and there being no input data or query remaining, the data base system or the data stream processing system may wait for input of a new query or new input data in operation S445.

The scheduler algorithm applied to the current example having parameters such as an execution unit of time, and a minimum idle time for entering a dormant state. The scheduler algorithm according to the current example may be different from other general algorithms in that the required minimum number of cycles is calculated and a dormant state may be selected to be entered. While no system end flag exists, the scheduling algorithm may continue to be performed. For each operation, checking whether new input data or a new query exists, and in response to new input data or a new query existing, the required minimum number of cycles may be calculated again and renewed.

In response to no new data or query existing, remaining data that is not processed is checked. In response to no remaining data existing, a standby mode may be entered until new data is input. In response to input data to be processed existing, an appropriate query to execute first may be selected. In response to a query being selected, the selected query may be performed as much as a time period set in advance multiplied by the required minimum number of cycles. In response to measuring the actual time taken for execution and in response to less time being taken than the time period set in advance, the remaining time period is compared with a minimum idle time. In response to the remaining time period being longer than the minimum idle time, a dormant state may be entered for a time period corresponding to the remaining time period.

The scheduling method according to the current example may be performed in connection with the following three algorithms: 1) an algorithm for selecting an appropriate query, 2) a calculation algorithm for calculating CPU cycles predicted to be executed per an input record, and 3) a calculation algorithm for calculating the required minimum number of cycles per unit time.

Hereinafter, the algorithm for selecting an appropriate query will be described. As a query selection method, an Earliest Deadline First (EDF) algorithm may be generally used, which may also be used in connection with other query selection algorithms. In the algorithm for selecting an appropriate query, a Deadline may be obtained by adding response time required for processing oldest data among query input data to required response time of query.

Hereinafter, the calculation of the number of CPU cycles predicted to be performed per an input record will be described. The expected time of execution of a query per an input record may be calculated according to Equation 2 below.

$$C_1 + \sum_{i=2}^{n}\left(C_i \times \prod_{i=1}^{j=i-1} s_i\right)$$ [Equation 2]

$C_i$=predicted number of cycles to be executed per record of an i-th operator
$s_i$=average selectivity of an i-th operator, $0 \leq s_i$
n=number of operators within a corresponding query execution plan The calculation algorithm for calculating a required minimum number of cycles per unit time will be described below.

In operation S410, calculating required minimum number of cycles with respect to a query regarding a periodic stream and a query regarding an intermittent stream and summing the two required minimum numbers of cycles to obtain the required minimum number of cycles per unit time. In this example, the required minimum number of cycles regarding the periodic stream may be obtained according to Equation 3 below.

$$\sum_{i=1}^{n} \frac{C_i}{P_i}$$ [Equation 3]

Figure 6:
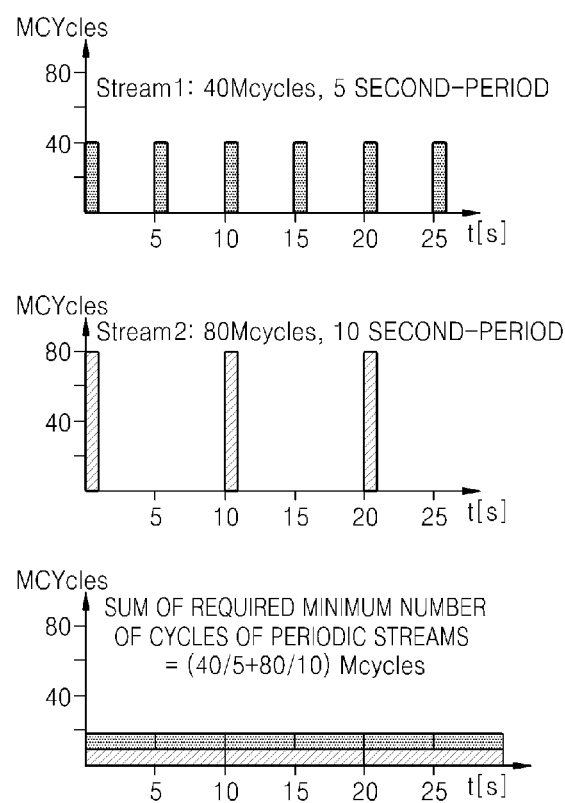
FIG. 6 illustrates an example of calculating a required minimum number of cycles per unit time in periodic stream.

$C_i$=predicted number of cycles to be executed per record of an i-th operator
$P_i$=period of an input stream of an i-th query
n=Number of periodic queries FIG. 6 illustrates an example of calculating a required minimum number of cycles per unit time in a periodic stream. Referring to FIG. 6, for Stream 1, cycles predicted to be executed per query record may correspond to 40 Mcycles, and an input period may be 5 seconds, and for Stream 2, cycles predicted to be executed per query record may correspond to 80 Mcycles, and an input period may be 10 seconds, and the sum of required cycle minimum of the periodic streams 1 and 2 may be 16 Mcycles (=40/5+80/10).

An intermittent stream query may refer to a query whose input stream period is not known or whose required response time may be shorter than its input stream period. A query of the data base system may correspond to an intermittent stream query.

A required minimum number of cycles per unit time for an intermittent stream may be calculated according to Equation 4 below.

$$\max_{i=1,\ldots,n} \frac{\sum_{j=1}^{i} C_j}{D_i}$$ [Equation 4]

$C_i$=predicted number of cycles to be executed per record of an i-th operator
$D_i$=deadline of an i-th query
n=Number of queries, where queries are aligned in order of deadlines

TABLE 2

| | Deadline | Cycles |
|---|---|---|
| Query 1 | 5 sec | 100M |
| Query 2 | 8 sec | 100M |
| Query 3 | 20 sec | 200M |

Figure 7A:
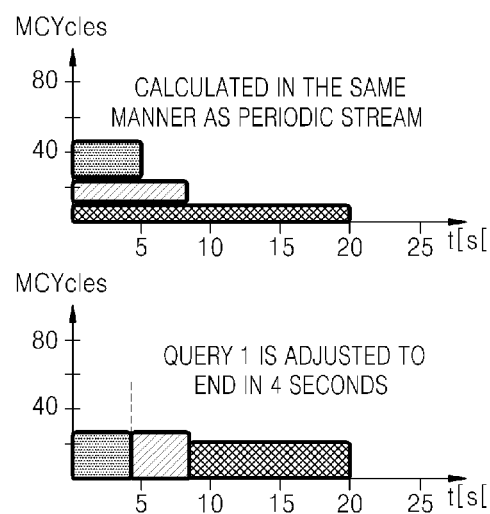
FIG. 7A illustrates an example of calculating a required minimum number of cycles per unit time in an intermittent stream.

For example, as shown in Table 2, in response to a deadline of Query 1 being 5 seconds and Query 1 taking 100 Mcycles, and in response to a deadline of Query 2 being 8 seconds and Query 2 taking 100 Mcycles, and in response to a deadline of Query 3 being 20 seconds and Query 3 taking 200 Mcycles, a required minimum number of cycles per unit time for the intermittent stream may be calculated in the same manner as in the case of a periodic stream and execution of the required number of cycles for Query 1 may be adjusted to end in 4 seconds using Equation 4, as shown in FIG. 7A. In other words, Query 1 may use 20 Mcycles per second to execute 100 Mcycles in 5 seconds but in response to Query 2 being accumulated to Query 1, Query 1 and Query 3 executing 200 Mcycles in 8 seconds, and thus 25 Mcycles may be required per second. In response to Query 1, Query 2, and Query 3 being accumulated, 400 Mcycles may be performed in 20 seconds, and thus 20 Mcycles may be used per second. Thus, the required minimum number of cycles per unit time may be 25 Mcycles. Accordingly, since Query 1 executes 25 Mcycles per second, 100 Mcycles may be completed in 4 seconds.

To reduce the cost of calculating a required minimum number of cycles in an intermittent stream query, a predetermined number of pieces of input data may be bundled up into batches to be used as a calculation unit. Calculation data of the batches may be as expressed in Equation 5 below.

Batch $_{predicted\ performance\ cycle}$=cycles predicted to be executed per record×number of records per batch [Equation 5]

Deadline of batch=time of oldest record within the batch+required response time of query Bundling a predetermined number of pieces of input data into batches and aligning the batches in order of deadlines and sequentially accumulating cycles predicted to be executed may be performed to calculate a required minimum number of cycles of a query regarding an intermittent stream. Then the greatest value among those obtained by dividing the accumulated cycle by a deadline may be determined as a required minimum number of cycles to be executed.

In other words, after aligning each batch in order of deadlines, the batches may be passed sequentially to accumulate cycles predicted to be executed and the greatest value among those obtained by dividing the accumulated cycles by a deadline may be determined as a required minimum number of cycles to be executed.

Figure 7B:
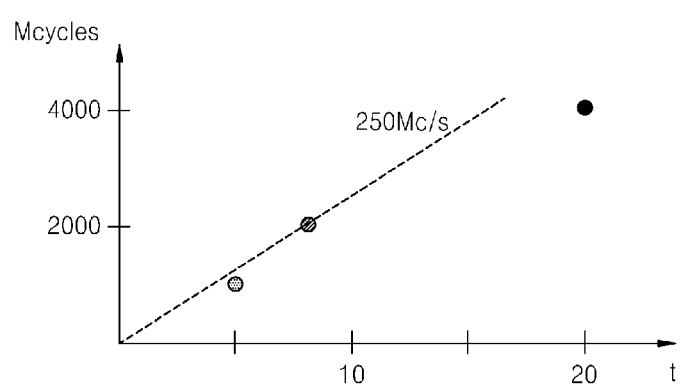
FIG. 7B illustrates an example of calculating a required minimum number of cycles per unit time for a batch of queries in intermittent stream.

FIG. 7B illustrates an example of calculating a required minimum number of cycles per unit time for batches of queries in an intermittent stream. For example, in response to three batches existing each having a deadline and cycles predicted to be executed, as shown in Table 3, a deadline may be represented by an x-axis and the accumulated number of cycles to be executed may be represented by a y-axis and each batch may be expressed by points. An inclination of a point having the steepest inclination from a zero point may be a required minimum number of cycles to be executed per unit time, as illustrated in FIG. 7B.

TABLE 3

|         | Deadline | Cycles |
|---------|----------|--------|
| Batch 1 | 5 sec    | 1000M  |
| Batch 2 | 8 sec    | 1000M  |
| Batch 3 | 20 sec   | 2000M  |

Figure 5:
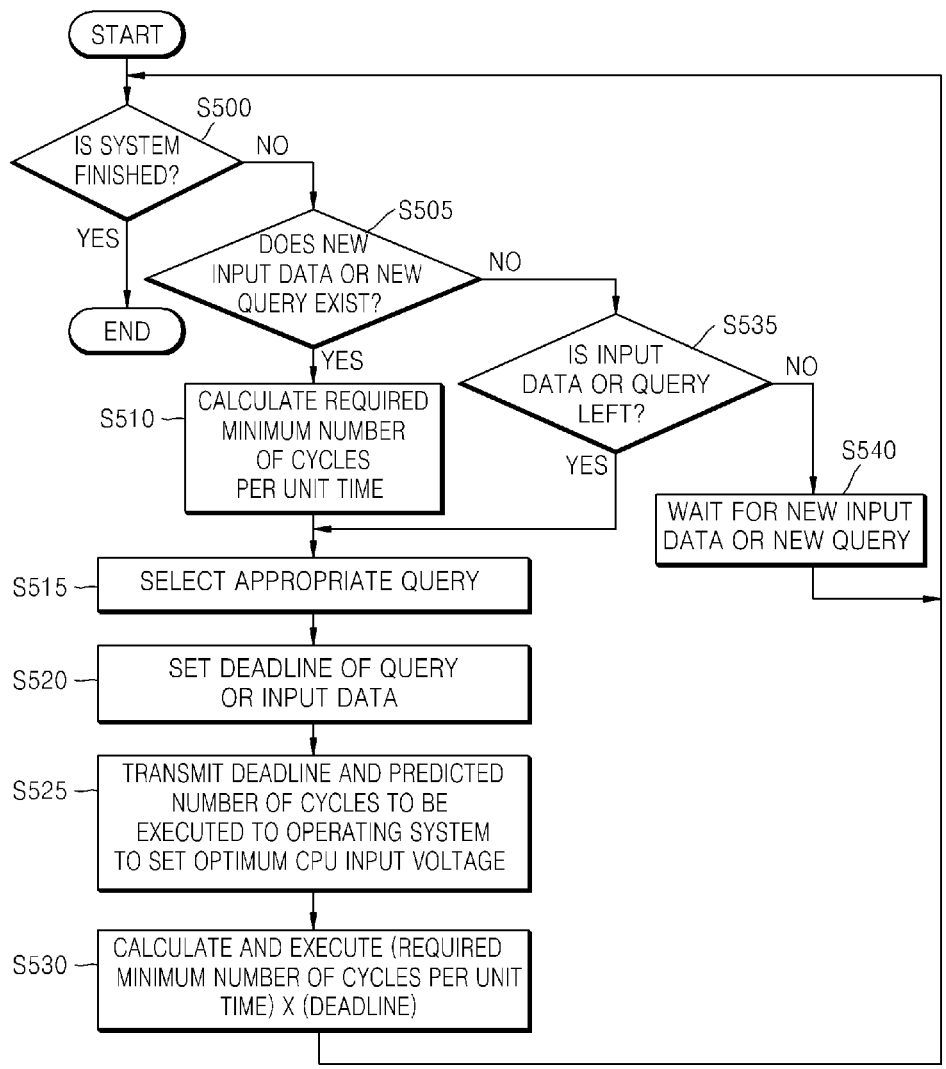
FIG. 5 is another example of a flowchart illustrating a method of reducing power consumption of a system using query scheduling of an application program.

FIG. 5 illustrates an example of a method of reducing power consumption of a system using query scheduling of an application program.

First, where a system is not finished, for example, in response to no system end flag existing in operation S500, a scheduling algorithm may be repeated. In addition, checking whether a new query or new input data is present in an input unit of a data base system or a data stream processing system in operation S505. In other words, the data base system simply checks whether there is a new query, and the data stream processing system checks whether there is new input data or a new query.

In response to a new query or new input data existing, the required minimum number of cycles per unit time, in other words, the minimum number of cycles per unit time that is required to process the new query or the new input data may be calculated in operation S510. In other words, checking whether new input data or a new query exists at every turn, and in response to the new input data or the new query existing, the required minimum number of cycles may be calculated again and renewed.

In operation S515, in response to the data base system or the data stream processing system processing a plurality of queries, a query to execute first may be selected.

In operation S520, in response to the query being selected, a predicted time period for executing the query may be calculated. Then, the calculated required minimum number of cycles per unit time and the predicted time period for executing the selected query is used to set a deadline by which the query or input data is to be processed. The predicted time period for executing the selected query may be calculated using Equation 2 described above. In Equation 2, an input record may refer to input data used to execute a query, and at least one input record may be used to execute the query. The query may include a plurality of operators that are expressed by a tree structure as illustrated in FIG. 3.

Next, the deadline and the predicted number of cycles to be executed may be transmitted to an operating system to set up an optimum CPU input voltage in operation S525.

In operation S530, the calculated required minimum number of cycles per unit time and the deadline by which the selected query or input data is to be processed may be multiplied to calculate the number of cycles to be processed within the deadline, and the calculated number of cycles may be executed.

Meanwhile, in response to the calculated number of cycles not being executed during the time period set in advance, and a plurality of queries being to be processed regarding the remaining query or input data, a query to be executed first may be selected in operation S515. Then, operation S520 or operation S530 may be performed. In operation S530, in response to all of the calculated number of cycles being performed within the deadline and no new input data or query remaining, the data base system or the data stream processing system waits for input of a new query or new input data in operation S540.

In another example of the method of reducing power consumption of a system using query scheduling of an application program of the current example, calculating the required minimum number of cycles with respect to a query regarding a periodic stream and a query regarding an intermittent stream and summing the two minimum cycle numbers to obtain the required minimum number of cycles per unit time calculated in operation S510. In this example, the required minimum number of cycles regarding the periodic stream may be obtained according to Equation 3 below.

The required minimum number of cycles of the intermittent stream, in other words, the required minimum number of cycles per unit time of the intermittent stream may be calculated using Equation 4. For example, as shown in Table 2, in response to a deadline of Query 1 being 5 seconds and Query 1 taking 100 Mcycles, and in response to a deadline of Query 2 being 8 seconds and Query 2 taking 100 Mcycles, and in response to a deadline of Query 3 being 20 seconds and Query 3 taking 200 Mcycles, a required minimum number of cycles per unit time for the intermittent stream may be calculated in the same manner as in the case of a periodic stream and execution of the required number of cycles for Query 1 may be adjusted to end in 4 seconds by using Equation 4, as shown in FIG. 7A. In other words, Query 1 requires 20 Mcycles per second to execute 100 Mcycles in 5 seconds but in response to Query 2 being accumulated to Query 1, Query 1 and Query 3 needing to execute 200 Mcycles in 8 seconds, and thus 25 Mcycles may be executed per second. In response to Query 1, Query 2, and Query 3 being accumulated, 400 Mcycles may be performed in 20 seconds, and thus 20 Mcycles is performed per second. Thus, the required minimum number of cycles per unit time is 25 Mcycles. Accordingly, since Query 1 executes 25 Mcycles per second, 100 Mcycles may be completed in 4 seconds.

Bundling a predetermined number of pieces of input data into batches and aligning the batches in order of deadlines and sequentially accumulating cycles that are predicted to be executed may be used to calculate the required minimum number of cycles of a query regarding an intermittent stream. Then the greatest value among those obtained by dividing the accumulated cycle by a deadline may be determined as a required minimum number of cycles to be executed. For example, in response to three batches each having a deadline and cycles predicted to be executed, as shown in Table 3, a deadline may be represented by an x-axis and the accumulated number of cycles to be executed may be represented by a y-axis and each batch may be expressed by points. An inclination of a point having the steepest inclination from a zero point may be a required minimum number of cycles to be executed per unit time, as illustrated in FIG. 7B.

Figure 8:
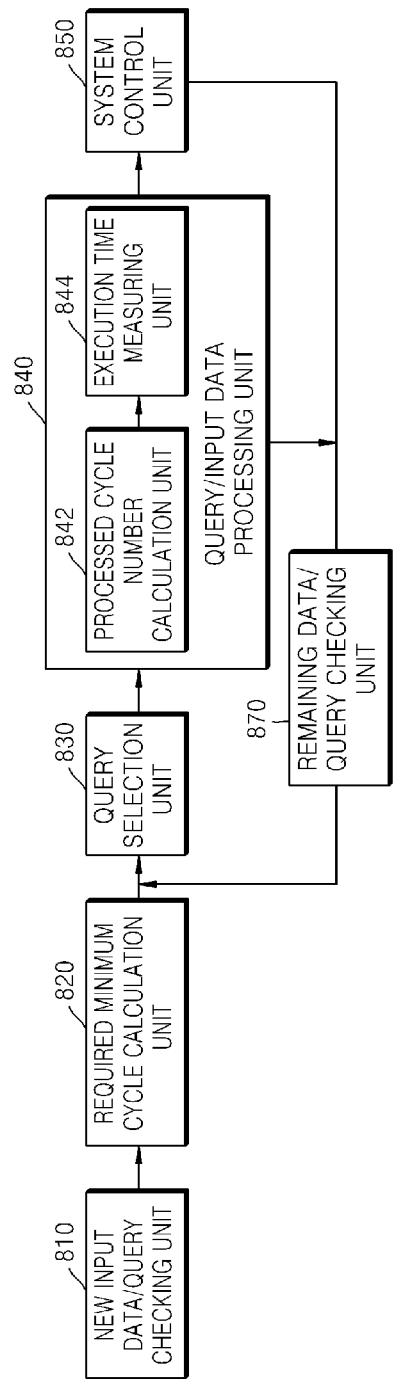
FIG. 8 is an example of a block diagram illustrating an exemplary configuration of a mobile terminal which reduces power consumption of a system by using the method of reducing power consumption of the system by using query scheduling of an application program.

FIG. 8 illustrates an example of a mobile terminal capable of reducing power consumption of a system using the method of reducing power consumption of a system using query scheduling of an application program.

The mobile terminal may have a data base system or a data stream processing system on an operating system, and include a required minimum cycle calculation unit 820, a query selection unit 830, a query/input data processing unit 840, and a system control unit 850, and may further include new input data/query checking unit 810 and a remaining data/query checking unit 860.

In response to a new query or new input data being input, the required minimum cycle calculation unit 820 may calculate the required minimum number of cycles per unit time which corresponds to the minimum number of cycles required to process the new query or the new input data per unit time.

The required minimum number of cycles may be obtained by using a calculation algorithm of the above-described required minimum number of cycles per unit time. In other words, calculating the required minimum number of cycles with respect to a query regarding a periodic stream and a query regarding an intermittent stream and summing the two minimum cycle numbers may obtain the required minimum number of cycles per unit time. In this example, the required minimum number of cycles regarding the periodic stream may be obtained according to Equation 3 below.

For example, a required minimum number of cycles per unit time in periodic stream may be calculated as illustrated in FIG. 6. FIG. 6 illustrates an example of calculating a required minimum number of cycles per unit time in the periodic stream. Referring to FIG. 6, for Stream 1, cycles predicted to be executed per query record may be 40 Mcycles, and an input period may be 5 seconds, and for Stream 2, cycles predicted to be executed per query record may be 80 Mcycles, and an input period may be 10 seconds, and the sum of required cycle minimum of the periodic streams 1 and 2 may be 16 Mcycles (=40/5+80/10). Also, an intermittent stream query may refer to a query whose input stream period is not known or whose required response time may be shorter than its input stream period. A query of the data base system corresponds to an intermittent stream query. In order to reduce the cost for calculating a required minimum number of cycles in an intermittent stream query, a predetermined number of pieces of input data may be bundled into batches to be used as a calculation unit. Calculation data of the batches may be as expressed in Equation 5 below.

Bundling a predetermined number of pieces of input data into batches and aligning the batches in order of deadlines and sequentially accumulating cycles predicted to be executed to calculate of a required minimum number of cycles of a query regarding an intermittent stream. Then the greatest value among those obtained by dividing the accumulated cycle by a deadline may be determined as a required minimum number of cycles to be executed. In other words, after aligning each batch in order of deadlines, the batches may be passed sequentially to accumulate cycles predicted to be executed and the greatest value among those obtained by dividing the accumulated cycles by a deadline may be determined as a required minimum number of cycles to be executed. For example, in response to three batches each having a deadline and cycles predicted to be executed, as shown in Table 3, a deadline may be represented by an x-axis and the accumulated number of cycles to be executed may be represented by a y-axis and each batch may be expressed by points. An inclination of a point having the steepest inclination from a zero point may be a required minimum number of cycles to be executed per unit time, as illustrated in FIG. 7B.

In response to a plurality of queries to be processed, the query selection unit 830 may select a query to execute first.

The query/input data processing unit 840 may multiply the required minimum number of cycles per unit time with a time period that is allocated to process the selected query or input data and may be set in advance to calculate and execute the number of cycles to be processed during the time period set in advance. The query/input data processing unit 840 may include a processed cycle number calculation unit 842 and an execution time measuring unit 844.

The processed cycle number calculation unit 842 may calculate the number of cycles to be processed during a time period set in advance by multiplying the required minimum number of cycles per unit time with time that is allocated to process the selected query or input data and is set in advance. The execution time measuring unit 844 may measure an actual time taken to execute the calculated number of cycles.

The system control unit 850 may control the system to be in a dormant state for the remaining time period in response to the execution of the calculated number of cycles being completed within the time period set in advance. In response to the measured time being shorter than the previously set time and the difference in time being equal to or greater than a predetermined time period, the processor of the system may be inert for the time period corresponding to the difference between the measured time and the previously set time and stay in a dormant state.

The new input data/query checking unit 810 may check whether a new query or new input data exists in an input unit of the data base system or the data stream processing system.

Meanwhile, the remaining data/query checking unit 860 may check whether input data or a query remains in response to the query/input data processing unit 840 not having completely processed the calculated number of cycles during the previously set time period.

In response to input data or query not processed yet and a plurality of queries to be processed existing with respect to remaining queries or input data, the query selection unit 830 may select a query to execute first. The query/input data processing unit 840 may process the selected query or the remaining input data.

Figure 9:
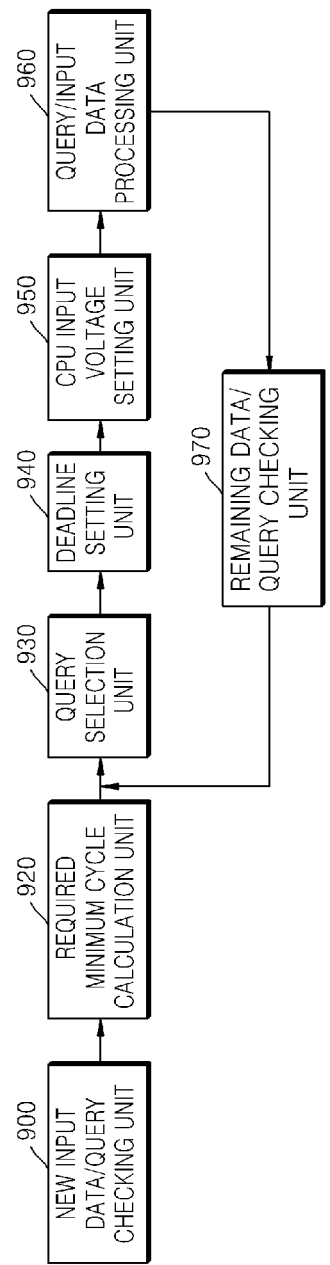
FIG. 9 is an example of a block diagram illustrating another exemplary configuration of a mobile terminal which reduces power consumption of a system by using the method of reducing power consumption of the system by using query scheduling of an application program.

FIG. 9 illustrates another example of a mobile terminal capable of reducing power consumption of a system using the method of reducing power consumption of a system using query scheduling of an application program.

The mobile terminal may include a data base system or a data stream processing system on an operating system, and include a required minimum cycle calculation unit 920, a query selection unit 930, a deadline setting unit 940, a CPU input voltage setting unit 950, and a query/input data processing unit 960. The mobile terminal may further include a new input data/query checking unit 900 and a remaining data/query checking unit 970.

In response to a new query or new input data being input, the required minimum cycle calculation unit 920 may calculate a required minimum number of cycles per unit time which relates to the number of cycles per minimum unit of time needed to process the new query or new input data and may be identical to the required minimum cycle calculation unit 820 illustrated in FIG. 8. Thus, a description of the calculation of a required minimum number of cycles per unit time will be omitted for conciseness.

The query selection unit 930 may select a query to execute first in response to a plurality of queries to be processed existing.

The deadline setting unit 940 may calculate a predicted time period for executing the query, and then use the calculated required minimum number of cycles per unit time and the predicted time period for executing the selected query to set a deadline by which the query or input data is to be processed. The predicted time period for executing the selected query may be calculated using Equation 2 described above. In Equation 2, an input record may refer to input data used to execute a query, and at least one input record may be used to execute the query. The query may include a plurality of operators that are expressed by a tree structure as illustrated in FIG. 3.

The CPU input voltage setting unit 950 may transmit the deadline by which the query or input data is to be processed and the number of cycles predicted to be executed, to an operating system to set up an optimum CPU input voltage.

The query/input data processing unit 960 may calculate and perform the number of cycles to be processed before the deadline by multiplying the calculated required minimum number of cycles per unit time with the deadline.

The new query/input data checking unit 900 may check whether a new query or new input data exists in an input unit of the data base system or the data stream processing system.

In response to the query/input data processing unit 960 not having completely processed the query or input data, the remaining data/query checking unit 970 may check whether remaining input data or query exists. In response to remaining input data or query existing, the query selection unit 930 may select a query to execute first in response to a plurality of queries to be processed existing. Then, the deadline setting unit 940, the CPU input voltage setting unit 950, and the query/input data processing unit 960 may operate sequentially to process the remaining input data or query.

In a data processing system such as a mobile terminal of which operating system uses an interval-based DVS method, in response to unit time for calculation a CPU occupancy and unit time for scheduling being the same, power consumption of the data processing system may be reduced. According to the one or more of the above examples, a CPU occupancy rate of the data base system or the data stream processing system may be maintained uniformly so that the operating system maintains a minimum input voltage of a CPU.

Also, in response to the operating system of the system using a task-based DVS method, the data base system or the data stream processing system according to the examples may transmit a calculated deadline and the number of cycles predicted to be executed, to the operating system so that the operating system is able to set an optimum CPU input voltage. In addition, by maintaining a uniform number of cycles to be executed per period, errors in predicting execution time of the operating system may be reduced.

The data base system or the data stream processing system may be mounted in the operating system of an electronic device such as a mobile terminal to which the examples may be applied to allow a minimum CPU occupancy rate per unit time under a given response time condition, and maintain a minimum input voltage of a processor in an under-loaded condition in which a load smaller than the maximum processing capacity of the system applied, thereby reducing the total power consumption of the system.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of reducing power consumption using query scheduling of an application program, the method comprising:

checking whether a new query or new input data exists in an input unit of a data base system or a data stream processing system;

in response to a new query or new input data existing, calculating a required minimum number of cycles per unit time which corresponds to the minimum number of cycles per unit time that is required to process the new query or the new input data;

selecting, in response to queries to be processed existing, a query to execute first;

calculating the number of cycles to be processed during the time period set in advance by multiplying the calculated, required minimum number of cycles per unit time with a time period that is allocated to process the selected query or the input data and is set in advance;

measuring an actual time taken to execute the calculated number of cycles; and in response to the measured time being less than the time period set in advance and a difference between the measured time and the time period set in advance is equal to or longer than a predetermined value, putting a processor of a system into a dormant state during the time corresponding to the difference.

2. The method of claim 1, further comprising:

in response to the calculated number of cycles not being executed during the time period set in advance, and queries to be processed for the remaining query or input data existing, selecting a query to execute first;

calculating the number of cycles to be processed during the time period set in advance by multiplying the calculated, required minimum number of cycles per unit time with a time period that is allocated to process the selected query or the input data and is set in advance;

measuring an actual time taken to execute the calculated number of cycles; and in response to the measured time being less than the time period set in advance and a difference between the measured time and the time period set in advance being equal to or longer than a predetermined value, putting a processor of a system into a dormant state during time corresponding to the difference.

3. The method of claim 1, further comprising, in response to all of the calculated number of cycles being executed during the time period set in advance, waiting for an input of a new query or new input data.

4. The method of claim 1, wherein the required minimum number of cycles per unit time is calculated by calculating the required minimum number of cycles with respect to a query regarding a periodic stream and a query regarding an intermittent stream and summing the two required minimum numbers of cycles.

5. The method of claim 4, wherein the required minimum number of cycles per unit time with respect to the period stream is calculated according to the following Equation:

$$\sum_{i=1}^{n} \frac{C_i}{P_i} \qquad \text{[Equation]}$$

$C_i$ =predicted number of cycles to be executed per record of an i-th operator
$P_i$ =period of an input stream of an i-th query
n =Number of periodic queries.

6. The method of claim 4, wherein the required minimum number of cycles per unit time with respect to the intermittent stream is calculated according to the following Equation:

$$\max_{i=1,\ldots,n} \frac{\sum_{j=1}^{i} C_j}{D_i} \qquad \text{[Equation]}$$

$C_i$ =predicted number of cycles to be executed per record of an i-th operator
$D_i$ =deadline of an i-th query
n =Number of queries, where queries are aligned in order of deadlines.

7. The method of claim 4, wherein the required minimum number of cycles per unit time with respect to the intermittent stream is calculated by bundling a predetermined number of pieces of input data into batches.

8. The method of claim 7, wherein the calculating of the required minimum number of cycles of a query with respect to an intermittent stream comprises:

bundling a predetermined number of pieces of input data into batches;

aligning the batches in order of deadlines and sequentially accumulating cycles predicted to be executed; and determining the greatest value among those obtained by dividing the accumulated cycle by a deadline as a required minimum number of cycles to be executed.

9. A non-transitory computer readable recording medium having embodied thereon a program for executing the method of claim 1.

10. A mobile terminal including a data base system or a data stream processing system on an operating system, the terminal comprising:

a required minimum cycle calculation unit configured to, in response to and based on a new query or a new input data being input, calculate a required minimum number of cycles per unit time required to process the new query or the new input data per unit time;

a query selection unit configured to select a query to execute first, in response to existing queries to be processed;

a processed cycle number calculation unit configured to calculate the number of cycles to be processed during a time period set in advance by multiplying the required minimum number of cycles per unit time with a time that is allocated to process the selected query or input data and is set in advance;

an execution time measuring unit configured to measure an actual time taken to execute the calculated number of cycles; and a system control unit configured to control a system to be in a dormant state for the remaining time period in response to the execution of the calculated number of cycles being completed within the time period set in advance.

11. The terminal of claim 10, further comprising a new query/input data checking unit configured to check whether a new query or new input data exists in an input unit of the data base system or the data stream processing system.

12. The mobile terminal of claim 11, wherein in response to the calculated number of cycles not being executed during the time period set in advance, and queries to be processed for the remaining query or input data existing, the query selection unit selects a query to execute first.

* * * * *